United States Patent [19]

Fukuda et al.

[11] Patent Number: 5,635,553
[45] Date of Patent: Jun. 3, 1997

[54] RESIN COMPOSITION WITH IMPROVED FLOWABILITY AND REDUCED GEL FORMATION

[75] Inventors: Kanako Fukuda; Tetsuo Yamaguchi, both of Osaka; Michiaki Yoshidomi; Yutaka Yamaguchi, both of Yamaguchi, all of Japan

[73] Assignees: Sumitomo Chemical Co., Ltd., Osaka; Ube Industries, Ltd., Ube, both of Japan

[21] Appl. No.: 632,799

[22] Filed: Apr. 17, 1996

[30] Foreign Application Priority Data

Apr. 17, 1995 [JP] Japan .................... 7-091184

[51] Int. Cl.$^6$ .................. C08J 5/13; C08L 77/00
[52] U.S. Cl. .................. 524/343; 525/58; 525/60
[58] Field of Search ................. 525/58; 524/343

[56] References Cited

U.S. PATENT DOCUMENTS

| | | | |
|---|---|---|---|
| 3,979,180 | 9/1976 | Lorand | 524/343 |
| 4,795,781 | 1/1989 | Miyamoto et al. | 525/58 |
| 4,952,628 | 8/1990 | Blatz | 525/58 |
| 5,219,929 | 6/1993 | Miyashita et al. | 525/57 |
| 5,243,859 | 9/1993 | Kobayashi | 73/204.24 |

FOREIGN PATENT DOCUMENTS

| | | |
|---|---|---|
| 0 252 597 | 1/1988 | European Pat. Off. . |
| 524 823 | 1/1993 | European Pat. Off. . |
| 54-78749 | 6/1979 | Japan . |
| 54-78750 | 6/1979 | Japan . |
| 55-34956 | 3/1980 | Japan . |
| 90/12062 | 10/1990 | WIPO . |

*Primary Examiner*—Ana Woodward
*Attorney, Agent, or Firm*—Cushman Darby & Cushman IP Group of Pillsbury Madison & Sutro, LLP

[57] ABSTRACT

A resin composition including (A) a mixture of one or more polyamide resins and one or more ethylene/vinyl alcohol copolymers; (B) 2,2'-methylenebis(4-methyl-6-tert-butylphenol); and (C) at least one polyalkyleneglycol is provided. The resin composition exhibits improved flowability during processing and remarkably decreased possibility of fish eye gel formation, thereby allowing for the production of formed products having a good external appearance.

12 Claims, No Drawings

RESIN COMPOSITION WITH IMPROVED FLOWABILITY AND REDUCED GEL FORMATION

BACKGROUND OF THE INVENTION

1. Field of the Invention

The present invention relates to a resin composition comprising a mixture of one or more polyamide resins and one or more ethylene/vinyl alcohol copolymers. More particularly, the present invention relates to a resin composition suitable for manufacturing into a film, which is improved in flowability during processing and in which formation of gel product is suppressed.

2. Description of Related Art

Polyamide resins have been widely used in various fields due to their favorable properties such as toughness, anti-pinhole property, gas barrier property, heat resistance and so on. Concerning these properties, however, specifically the gas barrier property, the polyamide resins by themselves are not always satisfactory and their application is limited to fields in which a higher gas barrier property is not required.

Ethylene/vinyl alcohol copolymers are resins known to have a gas barrier property superior to that of the polyamide resins. While ethylene/vinyl alcohol copolymers are certainly superior in gas barrier property, they are deficient in that formed products thereof are hard and fragile and thus susceptible to fracture and pinhole formation, for example, when used in the formation of films, and particularly during packaging and transfer or transport of packaged products when they are used as a film or sheet for food packages. Therefore, their superior gas barrier property has not been made of good use.

Japanese patent applications, JP-B-44-24277, JP-B-48-22833 and JP-A-55-34956, the disclosures of which are hereby incorporated by reference, proposed to produce formed products such as films making favorable use of the good points of both polyamide resins and ethylene/vinyl alcohol copolymers, i.e., the gas barrier property of the ethylene/vinyl alcohol copolymers and the heat resistance and anti-pinhole property of the polyamide resins, by mixing a polyamide resin and an ethylene/vinyl alcohol copolymer.

While the gas barrier property of the polyamide resins could be improved by blending an ethylene/vinyl alcohol copolymer into a polyamide resin, a new problem arose that the polyamide resin and the ethylene/vinyl alcohol copolymer chemically reacted during processing, i.e., while in a processing machine such as an extruder, to form an undesirable gel product which remained in the final product such as a film. Because the problem of gel formation becomes more remarkable as the forming temperature becomes higher, laid open Japanese patent applications, JP-A-54-78749 and JP-A-54-78750, the disclosures of which are hereby incorporated by reference, proposed the use of a low melting copolymeric polyamide which allows for forming at a lower temperature.

Since, however, there is a limit in the prevention of gelling, even if a copolymeric polyamide is used, the development of a resin composition wherein gelling is reduced without deteriorating processability in the molding of a mixture of a polyamide resin and a ethylene/vinyl alcohol copolymer is strongly desired.

The resin composition of the present invention is the result of extensive studies conducted by the present inventors for improving stability in the processing of a mixture of one or more polyamide resins and one or more ethylene/vinyl alcohol copolymers, for example, for solving the problem of fish eye gel formation in the processing of the resin composition into a film.

SUMMARY OF THE INVENTION

It is therefore an object of the present invention to provide a resin composition with improved flowability and improved stability during processing.

It is a further object of the present invention to provide a resin composition in which there is no or at least essentially eliminated fish eye gel formation.

These objects and others are accomplished according to the present invention, wherein there is provided a resin composition comprising:

(A) a mixture of one or more polyamide resins and one or more ethylene/vinyl alcohol copolymers, (B) 2,2'-methylenebis(4-methyl-6-tert-butylphenol), and (C) at least one polyalkyleneglycol.

DETAILED DESCRIPTION OF THE INVENTION

The main ingredient (A) in the resin composition of the present invention is a mixture of one or more polyamide resins and one or more ethylene/vinyl alcohol copolymers. This polyamide resin is a polymer having an amide bond and includes, for example without limitation, polymers such as:

polycaproamide (Nylon-6), polyaminoundecanoic acid (Nylon-11), polylauryllactam (Nylon-12), polyhexamethyleneadipamide (Nylon-66), polyhexamethylenesebacamide (Nylon-610), polyhexamethylenedodecamide (Nylon-612), and copolymers such as:

caprolactam/lauryllactam copolymer (Nylon-6/12), caprolactam/aminoundecanoic acid copolymer (Nylon-6/11), caprolactam/hexamethylene diammonium adipate copolymer (Nylon-6/66), caprolactam/hexamethylene diammoniumadipate/hexamethylenediammonium sebacate copolymer (Nylon-6/66/610) and caprolactam/hexmethylene diammoniumadipate/hexamethylene diammoniumdodecanoate copolymer (Nylon-6/66/612).

These examples of suitable polyamide resins can be used in the ingredient (A) of the resin composition independently or in a mixture of two or more.

Among the above examples, polyamide resins containing caproamide as the main component, such as Nylon-6, Nylon-6/12, Nylon-6/11, Nylon-6/66, Nylon-6/66/610 and Nylon-6/66/612 are preferred because they are superior in improving hot water resistance when mixed with an ethylene/vinyl alcohol copolymer. In particular, polyamide resins containing about 60% by weight or more of caproamide as the main component are more preferred because they exhibit improved stretching property and impact resistance in addition to improved hot water resistance when mixed with an ethylene/vinyl alcohol copolymer.

One or more ethylene/vinyl alcohol copolymers, the other component of the ingredient (A) mixture of the resin composition, are prepared by saponifying an ethylene/vinyl acetate copolymer. Preferred ethylene/vinyl alcohol copolymers have an ethylene content of about 10%–about 60% by mole and a degree of saponification of about 90% or more, and more preferably an ethylene content of about 15%–about 50% by mole and a degree of saponification of about 95% or more. If the ethylene content is lower than about 10% by mole, a mixture with a polyamide resin is likely to exhibit inferior extrusion, molding property and heat stability. On the contrary, if the ethylene content exceeds about 60% by mole, a mixture with a polyamide resin is likely to exhibit inferior gas barrier property. When the degree of saponification is lower than about 90%, gas barrier property is deteriorated and a formed product from a mixture with a polyamide resin is likely to exhibit lowered dimensional stability.

Intrinsic viscosity of the ethylene/vinyl alcohol copolymer is preferably about 0.07–about 0.17 l/g. If the intrinsic viscosity is lower than about 0.07 l/g, strength is insufficient and a mixture with a polyamide resin becomes difficult to extrude stably. On the other hand, if the intrinsic viscosity exceeds about 0.17 l/g, the temperature for extruding a mixture with a polyamide resin must be elevated and gelling is liable to be promoted.

The ratio of the polyamide resin(s) and the ethylene/vinyl alcohol copolymer(s) in the ingredient (A) mixture of the resin composition of the present invention is preferably within a range of about 95:5–about 5:95 and more preferably within a range of about 90:10–about 10:90 by weight. If the amount of the ethylene/vinyl alcohol copolymer in the mixture is too small, the contribution to improving the gas barrier property of the composition is not always sufficient. On the contrary, if the amount of the ethylene/vinyl alcohol copolymer is too much, the resulting film is susceptible to fracture and pinhole formation and heat resistance is liable to be lowered.

The ingredient (B) of the resin composition of the present invention is 2,2'-methylenebis(4-methyl-6-tert-butylphenol), which is commercially available as an antioxidant.

The ingredient (C) of the resin composition of the present invention is at least one polyalkylene glycol and while its kind is not limited, polyethylene glycol and polypropylene glycol are generally preferred. The polyalkylene glycol preferably has a weight average molecular weight of 2000 or less. If the average molecular weight of the polyalkylene glycol exceeds 2000, the resin composition containing it has a higher melting viscosity and thus exhibits lowered flowability.

In the resin composition of the present invention, it is preferred to add the ingredient (B): 2,2'-methylenebis(4-methyl-6-tert-butylphenol) and the ingredient (C): at least one polyalkylene glycol each in an amount within a range of about 0.01 or more parts by weight, and more particularly about 0.01 to about 2 parts by weight, per 100 parts by weight of the ingredient (A): mixture of polyamide resin(s) and ethylene/vinyl alcohol copolymer(s). If each amount of the ingredient (B) and (C) is less than about 0.01 parts by weight, the effect of co-use (i.e., using both (B) and (C)) is not sufficiently obtained. On the contrary, if each amount of the ingredient (B) and (C) exceeds about 2 parts by weight, the effect of co-use is not increased proportionally and such use becomes economically disadvantageous.

The resin composition according to the present invention may contain other additives in addition to the ingredients (B) and (C), if desired, for example, phenolic antioxidant other than the ingredient (B), phosphite/phosphonite antioxidant, thioester antioxidant, ultraviolet light absorber, hindered amine light stabilizer, lubricant, pigment, plasticizer, nucleating agent and inorganic filler. The optional additives include the following examples.

Examples of the phenol antioxidant other than the ingredient (B) include without limitation:

4,4'-butylidenebis(3-methyl-6-tert-butylphenol), 4,4'-thiobis(3-methyl-6-tert-butylphenol), n-octadecyl 3-(3,5-di-tert-butyl-4-hydroxyphenyl) propionate, pentaerythrilyl tetrakis[3-(3,5-di-tert-butyl-4-hydroxyphenyl)propionate], triethyleneglycol bis [3-(3-tert-butyl-4-hydroxy-5-methylphenyl)propionate], 3,9-bis[2-{3-(3-tert-butyl-4-hydroxy-5-methylphenyl)-propionyloxy}-1,1-dimethylethyl]-2,4,8,10-tetraoxaspiro-[5,5]undecane, 1,3,5-trimethyl-2,4,6-tris(3,5-di-tert-butyl-4-hydroxybenzyl)benzene, tris-(4-tert-butyl-3-hydroxy-2,6-dimethylbenzyl)-isocyanurate, tris-(3,5-di-tert-butyl-4-hydroxybenzyl)isocyanurate, 2,4-bis(n-octylthio)-6-(3,5-di-tert-butyl-4-hydroxyanilino)-1,3,5-triazine, N,N'-bis[3-(3,5-di-tert-butyl-4-hydroxyphenyl) propionyl]-hexamethylenediamine, 2-tert-butyl-6-(3-tert-butyl-5-methyl-2-hydroxybenzyl)-4-methylphenyl acrylate, 2,4-di-tert-pentyl-6-[1-(2-hydroxy-3,5-di-tert-pentylphenyl)ethyl]phenyl acrylate, and 2,2'-ethylidenebis(4,6-di-tert-butylphenol), among others.

Examples of the phosphor antioxidant include without limitation:

distearyl pentaerythritol diphosphite, tris(2,4-di-tert-butylphenyl)phosphite, bis(2,4-di-tert-butylphenyl)pentaerythritol diphosphite, bis(2-tert-butyl-4-methylphenyl) pentaerythritol diphosphite, bis(2,4,6-tri-tert-butylphenyl) pentaerythritol diphosphite, tetrakis(2,4-di-tert-butylphenyl)-4,4'-biphenylene diphosphonite, tetratridecyl 4,4'-butylidenebis(3-methyl-6-tert-butylphenyl)diphosphite, 2,2'-methylenebis(4,6-di-tert-butylphenyl)octyl phosphite, and 2,2'-ethylidenebis(4,6-di-tert-butylphenyl)fluorophosphonite, among others.

Examples of the sulfur antioxidant include without limitation:

pentaerythrityl tetrakis(3-laurylthiopropionate), dilauryl 3,3'-thiodipropionate, dimyristyl 3,3'-thiodipropionate, distearyl 3,3'-thiodipropionate, among others.

Examples of the ultraviolet light absorber include without limitation:

2,hydroxy-4-methoxybenzophenone, 2-hydroxy-4-octyloxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2[hydroxy-3-(3,4,5,6-tetrahydrophthalimidomethyl)-5-methylphenyl]benzotriazole;

2-(3-tert-butyl-2-hydroxy-5-methylphenyl)-5-chlorobenzo-triazole, 2-(2-hydroxy-5-tert-octylphenyl)benzotriazole, 2-(3,5-di-tert-butyl-2-hydroxyphenyl)benzotriazole, 2-(3,5-di-tert-pentyl-2-hydroxyphenyl)benzotriazole, 2-(3,5-di-tert-butyl-2-hydroxyphenyl)-5-chlorobenzotriazole, 2-[2-hydroxy-3,5-bis(a,a-dimethylbenzyl)phenyl]-2H-benzotriazole, 2,2'-methylenebis[6-(2H-benzotriazole-2-yl)-(1,1,3,3-tetramethylbutyl)phenol], 2,2'-methylenebis[4-tert-butyl-6-(2H-benzotriazole-2-yl)phenol], a condensate of poly(3-11)(ethyleneglycol) and methyl 3-[3-(2H-benzotriazole-2-yl)-5-tert-butyl-4-hydroxyphenyl]propionate, 2-ethylhexyl 3-[3-tert-butyl-5-(5-chloro-2H-benzotriazole-2-yl)-4-hydroxyphenyl]propionate, octyl 3-[3-tert-butyl-5-(5-chloro-2H-benzotriazole-2-yl)-4-hydroxyphenyl]propionate, methyl 3-[3-tert-butyl-5-(5-chloro-2H-benzotriazole-2-yl)-4-hydroxyphenyl]propionate, 3-[3-tert-butyl-5-(5-chloro-2H-benzotriazole-yl)-4-hydroxyphenyl]propionic acid, among others.

Examples of the hindered amine light stabilizer include without limitation:

bis(2,2,6,6-tetramethyl-4-piperidyl)sebacate, bis(1,2,2,6,6-pentamethyl-4-piperidyl) 2-(3,5-di-tert-butyl-4-hydroxybenzyl)-2-butyl malonate, bis(1-acryloyl-2,2,6,6-tetramethyl-4-piperidyl) 2,2-bis(3,5-di-tert-butyl-4-hydroxybenzyl)malonate, bis(1,2,2,6,6-pentamethyl-4-piperidyl)decanedioate, bis(2,2,6,6-tetramethyl-4-piperidyl)succinate, 2,2,6,6-tetramethyl-4-piperidyl methacrylate, 1,2,2,6,6-pentamethyl-4-piperidyl methacrylate, 4-[3-(3,5-di-tert-butyl-4-hydroxyphenyl)propionyloxy]-1-[2-{3-(3,5-di-tert-butyl-4-hydroxyphenyl)propionyloxy}]-2,2,6,6-tetramethylpiperidine, 2-methyl-2-(2,2,6,6-tetramethyl-4-piperidyl)amino-N-(2,2,6,6-tetramethyl-4-piperidyl)amino-N-(2,2,6,6-tertramethyl-4-piperidyl)propionamide, tetrakis(2,2,6,6-tetramethyl-4-piperidyl)1,2,3,4-butanetetracarboxylate, tetrakis(1,2,2,6,6-pentamethyl-4-piperidyl)1,2,3,4-butanetetracarboxylate, a mixed esterification product of 1,2,3,4-butanetetracarboxylic acid and 1,2,2,6,6-pentamethyl-4-piperidinol and 1-tridecanol, a mixed esterification product of 1,2,3,4-butanetetracarboxylic acid and 2,2,6,6-tetramethyl-4-piperdinol and 1-tridecanol, a mixed esterification product of 1,2,3,4-butanetetracarboxylic acid and 1,2,2,6,6-pentamethyl-4-piperidinol and 3,9-bis(2-hydroxy-1,1-dimethylethyl)-2,4,8,10-tetraoxaspiro[5,5]undecane, a mixed esterification product of 1,2,3,4-butanetetracarboxylic acid and 2,2,6,6-tetramethyl-4-piperidinol and 3,9-bis(2-hydroxy-1,1-dimethylethyl)-2,4,8,10-tetraoxaspiro[5,5]undecane, a polycondensation product of dimethyl succinate and 1-(2-hydroxyethyl)-4-hydroxy-2,2,6,6-tetramethylpiperidine, poly[(6-morpholino-1,3,5-triazine-2,4-diyl){(2,2,6,6-tetramethyl-4-piperidyl)imino}hexamethylene {(2,2,6,6-tetramethyl-4-piperidyl)imino}], poly[{6-(1,1,3,3-tetramethylbutyl)imino-1,3,5-triazine-2,4-diyl}{(2,2,6,6-tetramethyl-4-piperidyl)imino}hexamethylene {(2,2,6,6-tetramethyl-4-piperidyl)imino}], tetramethyl-4-piperidyl)imino) ], a polycondensate of N,N'-bis(2,2,6,6-tetramethyl-4-piperidyl)hexamethylenediamine and 1,2,-dibromoethane, N,N',4,7-tetrakis[4,6-bis{N-butyl-N-(2,2,6,6-tetramethyl-4-piperidyl)amino}-1,3,5-triazine-2-yl]-4,7-diazadecane-1,10-diamine, N,N',4-tris[4,6-bis{N-butyl-N-(2,2,6,6-tetramethyl-4-piperidyl)amino}-1,3,5-triazine-2-yl]-4,7-diazadecane-1,10-diamine, N,N',4,7-tetrakis[4,6-bis{N-butyl-N-(1,2,2,6,6-pentamethyl-4-piperidyl)amino}-1,3,5-triazine-2yl]-4,7-diazadecane-1,10-diamine, and N,N',4-tris[4,6-bis{N-butyl-N-(1,2,2,6,6-pentamethyl-4-piperidyl)amino}-1,3,5-triazine-2-yl]-4,7-diazadecane-1,10-diamine.

Suitable examples of other optional additives mentioned above, such as lubricant, pigment, plasticizer, nucleating agent and inorganic filler, are those known to one of ordinary skill in the art and may be included as needed and in amounts which achieve desired results for the particular end use for the resin composition.

In the resin composition of the present invention, any conventional method can be adopted for compounding the ingredient (B) 2,2'-methylenebis(4-methyl-6-tert-butylphenol), the ingredient (C) at least one polyalkyleneglycol, and other additives such as those described above which may additionally be used as required, with the ingredient (A) mixture of one or more polyamide resins and one or more ethylene/vinyl alcohol copolymers.

For example, either of the ingredient (A) polyamide resin(s) or the ethylene/vinyl alcohol copolymer(s) can be compounded with the other ingredients (B) and (C), and any further additives desired, before the polyamide resin(s) and the ethylene/vinyl alcohol copolymer(s) are compounded. Alternatively, other ingredients (B) and (C), and any further additives desired, can be compounded when the ingredient (A) mixture of the polyamide resin(s) and the ethylene/vinyl alcohol copolymer(s) are compounded.

The production of the resin composition according to the present invention can be carried out by any conventional method using an apparatus which enables uniform mixing of the polyamide resin(s) and the ethylene/vinyl alcohol copolymer(s). For example, conventional methods wherein the ingredient (A) polyamide resin(s) and the ethylene/vinyl alcohol copolymer(s), each in a state of pellet or powders, are uniformly mixed and melt-kneaded in a single- or twin-screw extruder to give pellets which are then formed, or wherein the ingredient (A) polyamide resin(s) and the ethylene/vinyl alcohol copolymer(s) are uniformly mixed and the mixture is directly fed into a film forming machine, an injection molding machine or the like and formed in the machine while kneading can be adopted. The ingredient (B) 2,2'-methylenebis (4-methyl-6-tert-butylphenol) and the ingredient (C) at least one polyalkyleneglycol, and any further additives desired, can be combined at any stage in these conventional methods.

Any conventional extrusion and injection molding method can be used for producing a film, a container or an injection molded article from the resin composition of the present invention.

With the resin composition according to the present invention, there is no significant formation of gelled substance over a long period in the molding process, and, therefore, a stable continuous molding can be realized. As a result, the resin composition of the present invention is particularly suited for use as a film and can be formed into such by conventional methods, for example, a casting method using a T-die or a coathanger die, a tubular extrusion method using a ring die, and the like.

The resin composition of the present invention exhibits desired properties such as improved flowability during processing, particularly during extrusion into a film, and remarkably decreased possibility of fish eye gel formation. Accordingly, formed products having a good external appearance can be obtained from the resin composition of the invention.

The resin composition of the present invention is illustrated in more detail by means of the following Example, which should not be construed as a limitation or restriction in the scope of the invention thereto. It is further understood that the inventors contemplate variations on the parameters and components of the resin composition described above, and uses thereof, within the scope of the present invention and that described in the related Japanese patent application no. 7-091184 (Apr. 17, 1995), the complete disclosure of which is hereby incorporated by reference.

EXAMPLE

In the following Example, parts are weight based unless otherwise specified. The ingredients (B) and (C), and other additives, used in the Example are listed below and hereinafter recited by the indicated symbols.

B: 2,2'-methylenebis(4-methyl-6-tert-butylphenol)

C-1: polypropylene glycol (average molecular weight: 400)

C-2: polypropylene glycol (average molecular weight: 1000)

C-3: polyethylene glycol (average molecular weight: 400)

C-4: polyethylene glycol (average molecular weight: 1000)

P-1: tris(2,4-di-tert butylphenyl)phosphite

Example 1

An ingredient (A) mixture consisting of 85 parts of Nylon-6/66 (Nylon-6 component: 85% by weight, Nylon-66 component: 15% by weight) and 15 parts of an ethylene/vinyl alcohol copolymer (ethylene content: 44% by mole or more, degree of saponification: 99% or more, and having an average molecular weight within the range of 15,000 to 30,000), and ingredients B, C-1 to C-4 and P-1 in the amounts shown in Table 1 were blended in various combinations corresponding to Run Nos. 1–4 (Example of the Invention) and 5–8 (Comparative Example) and tested for gel formation by kneading in a nitrogen flow, at a temperature of 280° C. and at a rotation of 60 rpm using a laboplastomil (manufactured by Toyoseiki Seisakusho, model: 40–100).

Any gelling which occurred by the reaction of the ethylene/vinyl alcohol copolymer and the polyamide resin in a melted state at an elevated temperature was monitored by the torque behavior which is associated with the occurrence of gelling. Therefore, the gel preventing property of the resin compositions of Run Nos. 1–8 was evaluated by the time period in minutes up to the torque peak (indicated in Table 1 as the gel time). The longer the gel time, the superior the gel preventing property. The results shown in Table 1 indicate the significantly longer gel times and thus the superior gel preventing property of the Example resin compositions according to the present invention (Run Nos. 1–4) as compared to the Comparative Examples (Run Nos. 5–8).

TABLE 1

| | Example of Invention | | | | Comparative Example | | | |
|---|---|---|---|---|---|---|---|---|
| Run No. | 1 | 2 | 3 | 4 | 5 | 6 | 7 | 8 |
| Test Stab. (parts) | | | | | | | | |
| B | 0.25 | 0.25 | 0.25 | 0.25 | | 0.5 | 0.25 | |
| C-1 | 0.25 | | | | | | | 0.5 |
| C-2 | | 0.25 | | | | | | |
| C-3 | | | 0.25 | | | | | |
| C-4 | | | | 0.25 | | | | |
| P-1 | | | | | | | 0.25 | |
| Gel Time (minutes) | 32.0 | 31.0 | 33.5 | 32.0 | 22.5 | 23.5 | 20.5 | 20.0 |

What is claimed is:

1. A resin composition comprising:
   (A) a mixture of one or more polyamide resins and one or more ethylene/vinyl alcohol copolymers,
   (B) 2,2'-methylenebis(4-methyl-6-tert-butylphenol), and
   (C) at least one polyalkyleneglycol.

2. The resin composition according to claim 1, wherein the proportion of the one or more polyamide resins and the one or more ethylene/vinyl alcohol copolymers contained in the mixture is a weight ratio within a range of about 95:5 to about 5:95.

3. The resin composition according to claim 1, wherein about 0.01–about 2 parts by weight of 2,2'-methylenebis(4-methyl-6-tert-butylphenol) and about 0.01–about 2 parts by weight of the at least one polyalkyleneglycol are contained per 100 parts by weight of the mixture of the one or more polyamide resins and the one or more ethylene/vinyl alcohol copolymers.

4. The resin composition according to claim 2, wherein about 0.01–about 2 parts by weight of 2,2'-methylenebis(4-methyl-6-tert-butylphenol) and about 0.01–about 2 parts by weight of the at least one polyalkyleneglycol are contained per 100 parts by weight of the mixture of the one or more polyamide resins and the one or more ethylene/vinyl alcohol copolymers.

5. The resin composition according to claim 1, wherein the at least one polyalkyleneglycol is selected from the group consisting of polyethyleneglycol and polypropyleneglycol, and has an average molecular weight of 2000 or less.

6. The resin composition according to claim 2, wherein the at least one polyalkyleneglycol is selected from the group consisting of polyethyleneglycol and polypropyleneglycol, and has an average molecular weight of 2000 or less.

7. The resin composition according to claim 3, wherein the at least one polyalkyleneglycol is selected from the group consisting of polyethyleneglycol and polypropyleneglycol, and has an average molecular weight of 2000 or less.

8. The resin composition according to claim 1, wherein the one or more polyamide resins are selected from the group consisting of polycaproamide (Nylon-6), caprolactam/lauryllactam copolymer (Nylon-6/12), caprolactam/aminoundecanoic acid copolymer (Nylon-6/

11), caprolactam/hexamethylene diammonium adipate copolymer (Nylon-6/66), caprolactam/hexamethylene diammoniumadipate/hexamethylenediammonium sebacate copolymer (Nylon-6/66/610) and caprolactam/hexmethylene diammoniumadipate/hexamethylene diammoniumdodecanoate copolymer (Nylon-6/66/612).

9. The resin composition according to claim 1, wherein the one or more polyamide resins contains 60% by weight or more of caproamide as the main component.

10. The resin composition according to claim 1, wherein the one or more ethylene/vinyl alcohol copolymers have an ethylene content of about 10– about 60% by mole and a degree of saponification of about 90% or more.

11. The resin composition according to claim 1, wherein the one or more ethylene/vinyl alcohol copolymers have an ethylene content of about 15%–about 50% by mole and a degree of saponification of about 95% or more.

12. The resin composition according to claim 1, wherein the one or more ethylene/vinyl alcohol copolymers have an intrinsic viscosity in the range of about 0.07 l/g–about 0.17 l/g.

* * * * *